United States Patent [19]

Brand

[11] Patent Number: 5,266,123
[45] Date of Patent: Nov. 30, 1993

[54] VEHICLE WASHING MACHINE
[75] Inventor: Shadley F. Brand, Chaska, Minn.
[73] Assignee: Anderson Chemical Company, Litchfield, Minn.
[21] Appl. No.: 797,458
[22] Filed: Nov. 22, 1991
[51] Int. Cl.$^5$ .............................................. B08B 3/02
[52] U.S. Cl. ...................................... 134/26; 134/123; 134/181; 134/100.1; 134/56 R
[58] Field of Search ............... 134/45, 56 R, 123, 172, 134/181, 100.1, 26, 37; 137/629, 630.13, 861; 239/76

[56] References Cited

U.S. PATENT DOCUMENTS

| | | | |
|---|---|---|---|
| 2,419,397 | 4/1947 | Frohuff et al. | 134/123 |
| 2,465,562 | 3/1949 | Hopper et al. | 134/123 X |
| 2,910,993 | 11/1959 | Phillips | 134/123 |
| 3,288,109 | 11/1966 | Smith, Jr. et al. | 134/123 X |
| 3,339,565 | 9/1967 | Williams | 134/123 X |
| 3,391,701 | 7/1968 | Richardson et al. | 134/123 |
| 3,510,352 | 5/1970 | Neuman | 134/45 |
| 3,522,910 | 8/1970 | Pfeiffer et al. | 137/861 X |
| 3,578,775 | 5/1971 | McMillen | 134/45 |
| 3,595,268 | 7/1971 | Archer | 134/100.1 |
| 3,795,254 | 3/1974 | Blosser | 134/123 |
| 3,881,328 | 5/1975 | Kleimola et al. | 134/100.1 |
| 4,254,644 | 3/1981 | Bartlett et al. | 137/861 X |
| 4,685,166 | 8/1987 | Belanger | 134/123 X |
| 4,788,993 | 12/1988 | Beer et al. | 134/123 |
| 4,857,113 | 8/1989 | Hodge | 134/32 |
| 4,865,254 | 9/1989 | Kragle | 137/861 |

FOREIGN PATENT DOCUMENTS

| | | | |
|---|---|---|---|
| 462573 | 7/1928 | Fed. Rep. of Germany | 134/123 |
| 123856 | 1/1959 | U.S.S.R. | 134/123 |
| 509564 | 7/1933 | United Kingdom | 134/123 |
| 1029004 | 5/1966 | United Kingdom | 134/123 |

Primary Examiner—Frankie L. Stinson
Attorney, Agent, or Firm—Kinney & Lange

[57] ABSTRACT

The present invention is a washing apparatus suited for use in washing outside surfaces of vehicles. Fluid is conducted along a conduit that is mounted to a support structure so as to permit selected displacements thereof along a longitudinal axis of the conduit and selected rotations thereof about the longitudinal axis. The fluid conducted through the conduit can be conducted through at least one of a plurality of nozzles that are mounted to the conduit. The conduit is selectively reciprocated along the longitudinal axis by a first driving device. In addition, the conduit is rotated about the longitudinal axis by a second driving device. As the conduit is displaced both about and along the longitudinal axis, the fluid forced through the nozzle is directed toward the outside surface of an object to be washed.

21 Claims, 9 Drawing Sheets

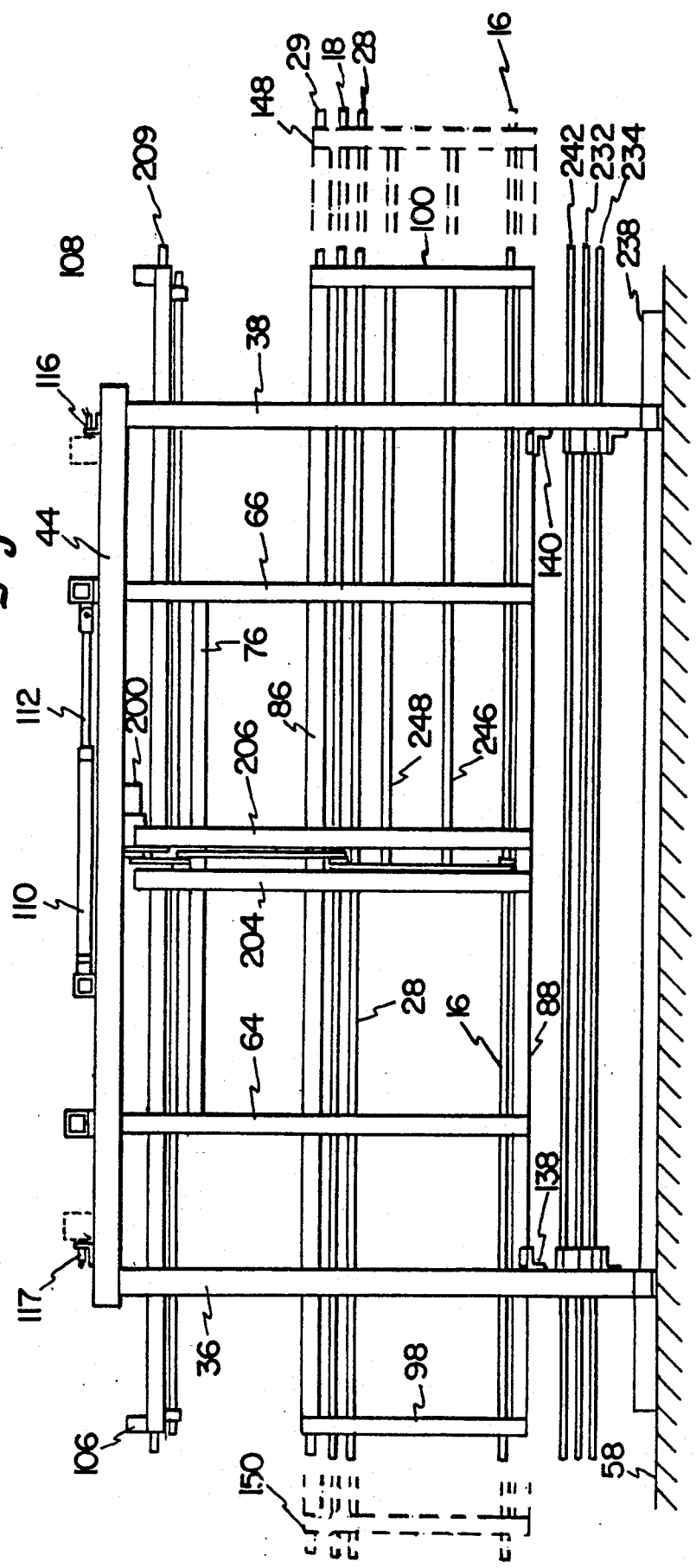

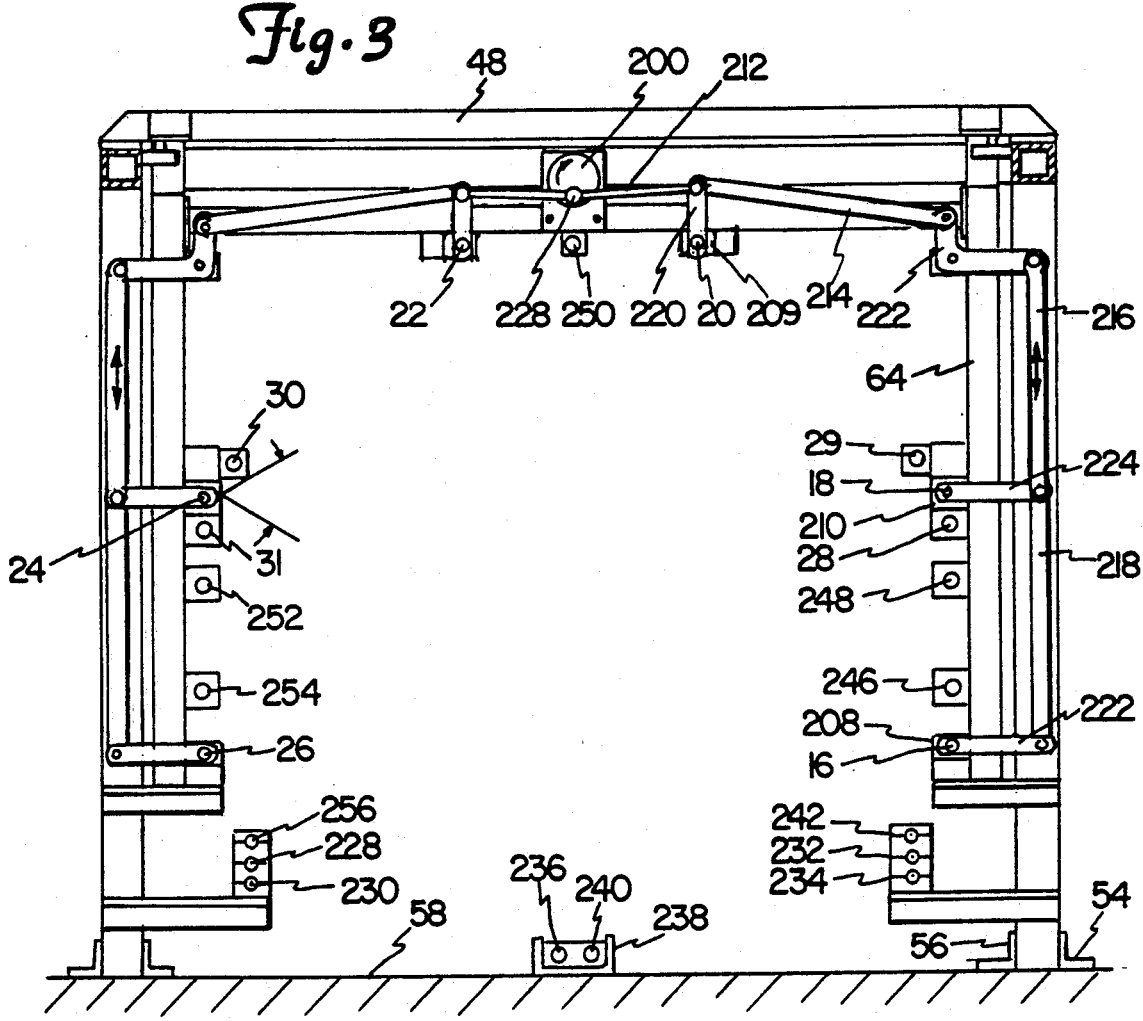
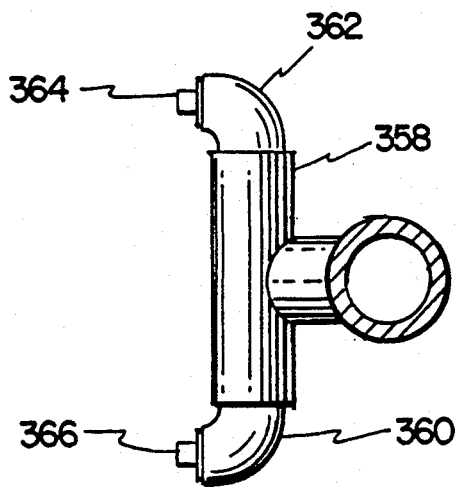

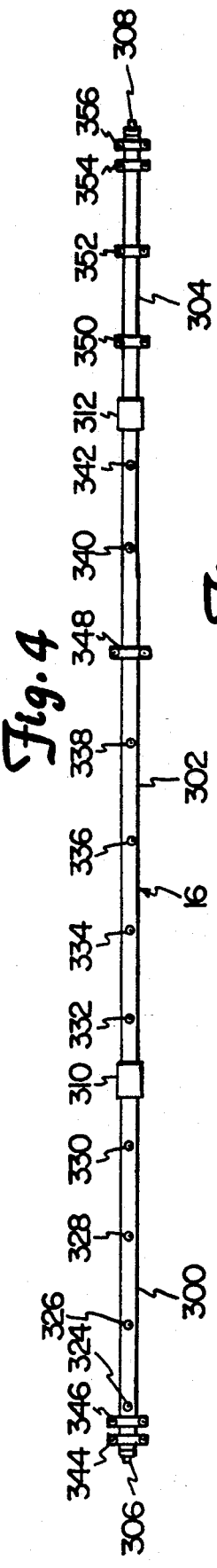
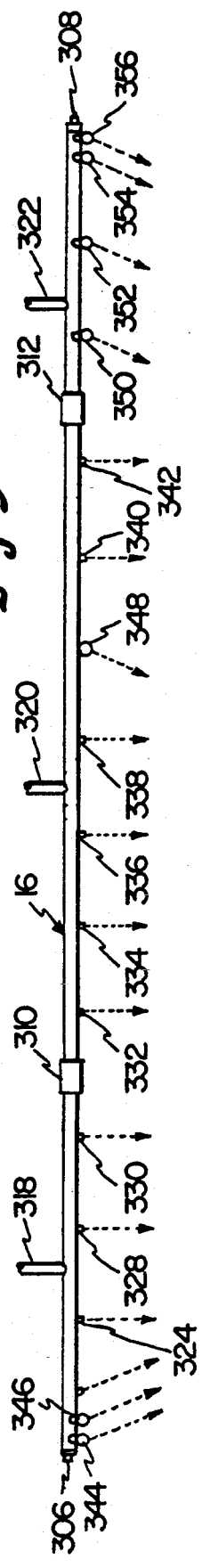
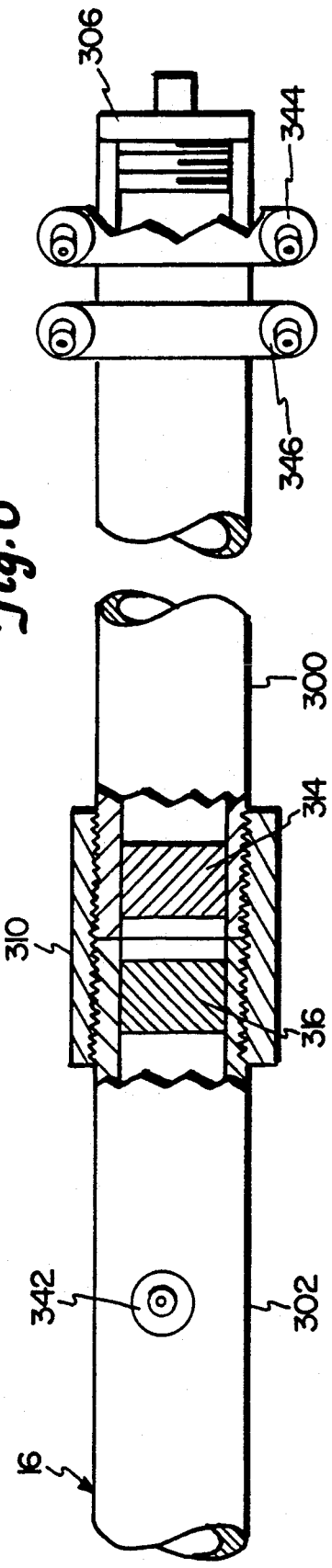

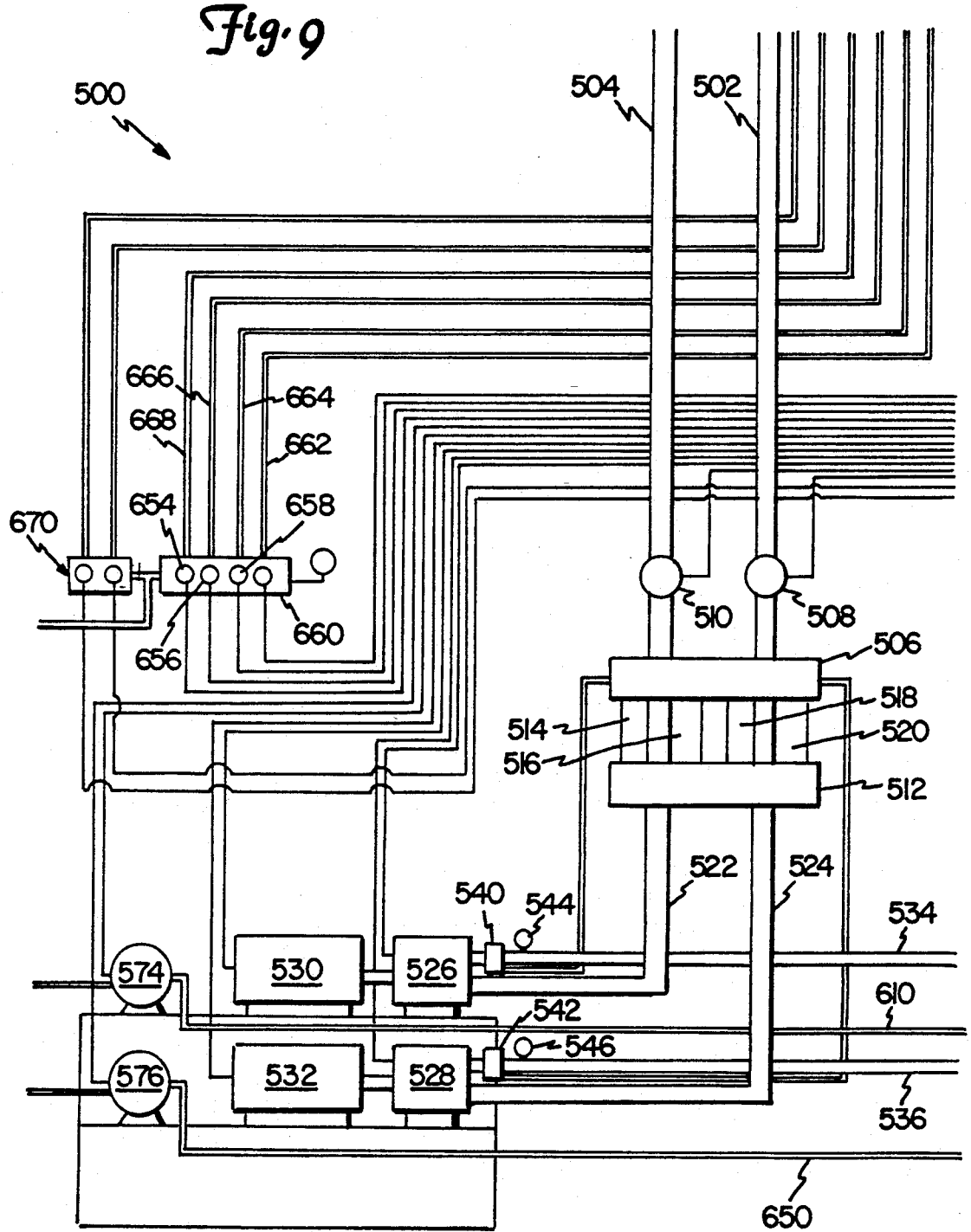

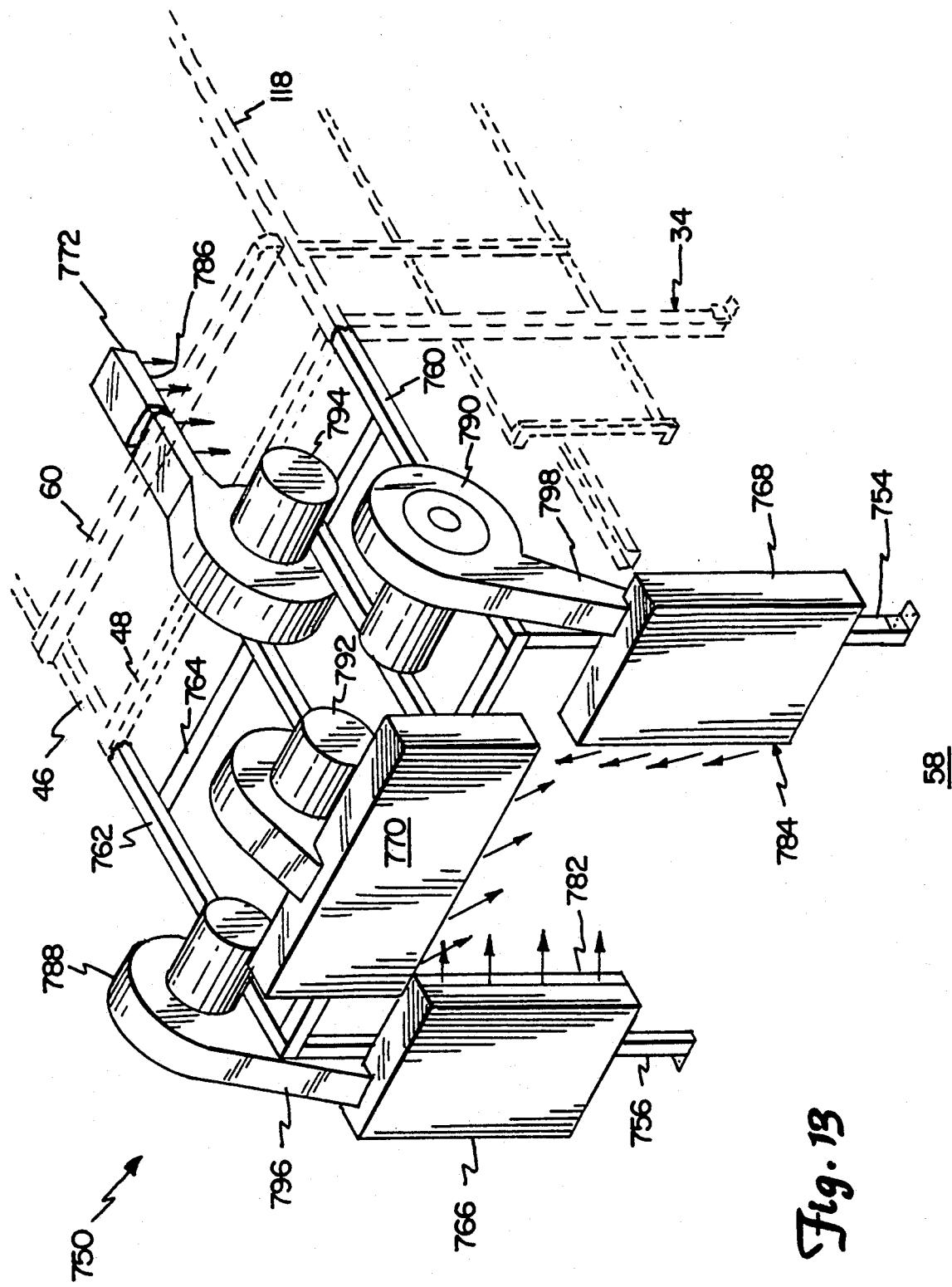

VEHICLE WASHING MACHINE

BACKGROUND OF THE INVENTION

This invention relates to a vehicle washing apparatus and, more particularly, to an apparatus having movable spray heads for washing a stationary vehicle.

Washing apparatus having movable spray heads rather than brushes has been proposed for washing the outer surfaces of vehicles. This type of washing apparatus has been better suited for removing dirt build-up in intricate vehicle recesses where equipment employing brushes is relatively ineffective. What might be called "brushless" car washes have heretofore been proposed, but cannot be considered high speed car washes for reasons like those in the example following.

U.S. Pat. No. 4,857,113 to Hodge shows a pair of side sprayers with each side sprayer having a double row of nozzles in spaced relationship along the linear length of the sprayer which parallels the length of a vehicle to be washed. Similarly, a top sprayer is equipped with a dual row of spray nozzles in a spaced relationship along the linear length of the sprayer array. Each sprayer is equipped with elements for oscillating the sprayer in a direction transverse to the linear length thereof. The vehicle undergoing a wash is moved along the length of the sprayer past the oscillating nozzles.

There is a present need for faster methods of washing vehicles, particularly for vehicle washing apparatus such as that shown in Hodge where the minimum wash time is at least the amount of time required to move the entire vehicle linearly past the oscillating sprayers. In addition, it is desirable that the number of moving parts be minimized thereby reducing maintenance costs. In addition to reducing the wash time, there is also a need for vehicle washing machine that efficiently utilizes water. Greater water efficiency allows vehicles to be washed with less water thereby reducing operating costs.

SUMMARY OF THE INVENTION

The present invention is a washing apparatus suited for use in washing outside surfaces of vehicles. The washing apparatus has a support with a first conduit mounted thereon. The first conduit is capable of conducting a fluid therealong, and is elongated along a longitudinal axis for a selected length. The first conduit is mounted on the support so as to permit both selected displacements thereof along said longitudinal axis and selected rotations thereof about the longitudinal axis.

Mounted on the first conduit is a plurality of nozzles. Fluid conducted through the first conduit can be conducted through at least one of the nozzles. The first conduit can be selectively reciprocated along the longitudinal axis by a first drive. The first conduit is reciprocated along the longitudinal axis between selected positions separated by a length less than the length of the first conduit. The first conduit is reciprocated through selected angular displacements about the longitudinal axis by a second drive. The first conduit can be displaced both about and along the longitudinal axis such that a fluid forced through the nozzle will be directed through a selected portion of a selected plane through which such a fluid passes.

BRIEF DESCRIPTION OF THE DRAWINGS

FIG. 2 is a side elevational view of the washing apparatus of FIG. 1,

FIG. 3 is a sectional view of the washing apparatus taken generally along lines 3—3 in FIG. 1, FIG. 4 is a side elevational view of a high pressure rotationally oscillating wash pipe shown in FIG. 1, FIG. 5 is a top elevational view of the high pressure wash pipe shown in FIG. 4, FIG. 6 is a greatly enlarged detail view shown in partially broken away cross section, the joint between two high pressure stages, and further showing details of a double nozzle arrangement, FIG. 7 is a side elevational view of the double nozzle shown in FIGS. 4, 5 and 6, FIG. 8 is a side elevational of a non-rotationally oscillated low pressure wash pipe shown in FIG. 1, FIGS. 9 and 10 are diagrammatic schematic diagrams of the wash pipe fluid supply apparatus of the present invention, FIG. 13 is a pictorial view of the drying apparatus of the present invention.

DETAILED DESCRIPTION OF THE PREFERRED EMBODIMENTS

Figure 1:
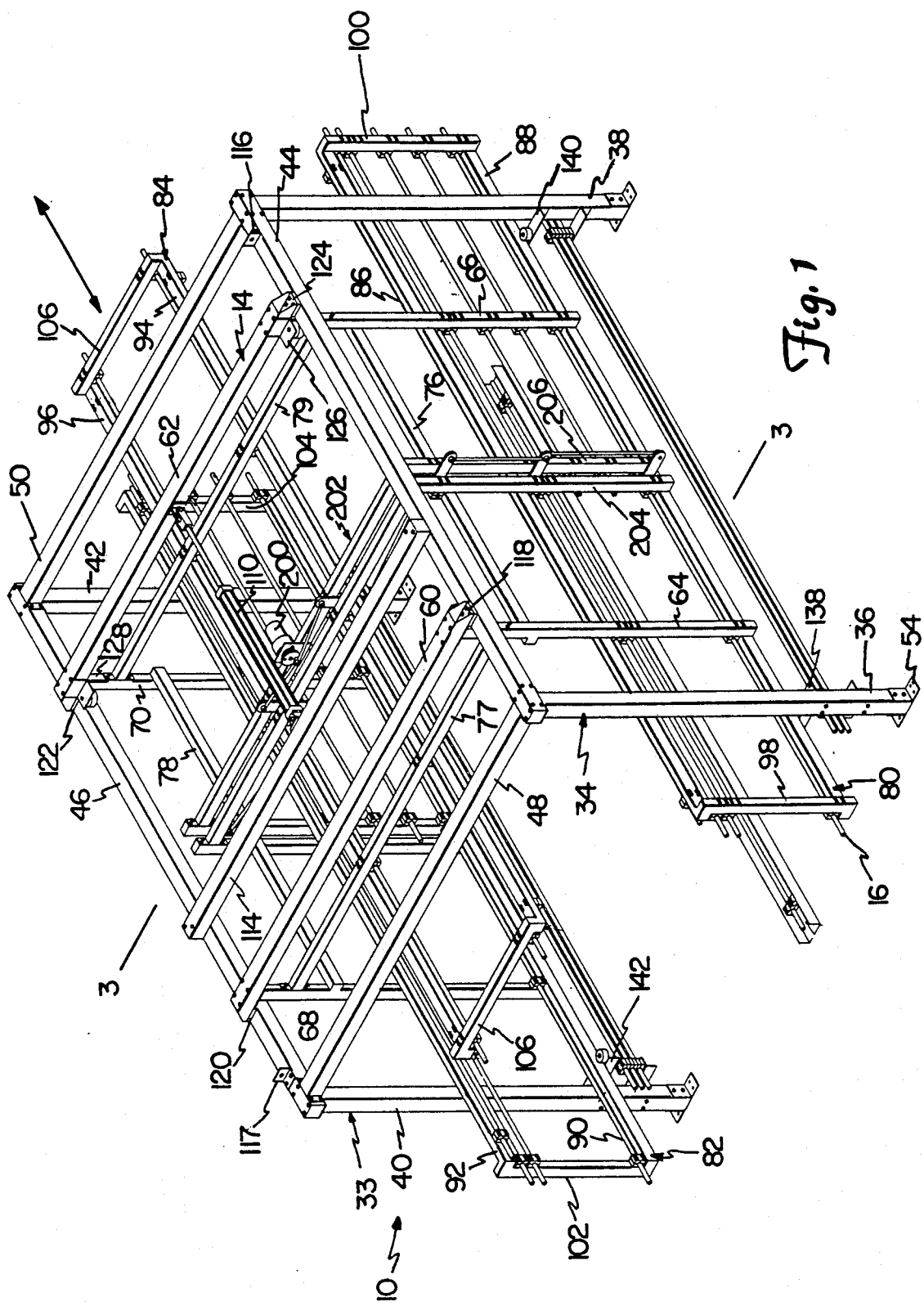
FIG. 1 is a pictorial view of the washing apparatus of the present invention.

Referring to FIG. 1, washing apparatus, 10, constructed in accordance with the present invention, includes a support structure, 12, having a reciprocating wash carriage, 14, mounted thereon. As wash carriage 14 reciprocates linearly on support structure 12, a series of rotating wash pipes, 16, 18, 20, 22, 24 and 26, mounted thereon oscillate so as to direct pressurized streams of cleansing liquid. Wash pipes 28, 29, 30 and 31 are mounted to wash carriage 14 and do not oscillate.

Support structure 12 includes two stationary, square cornered arches, 32 and 34, spaced apart and aligned parallel to each other. Each of the square cornered arches 32 and 34 include a pair of vertical beam members, 36 and 38, and 40 and 42, respectively, with each pair of vertical beam members having two parallel overhead beam members, 44 and 46, respectively attached thereto. Overhead beams 44,46 of the first and second arches 32 and 34 are connected by two parallel overhead transverse brace members, 48 and 50. Arches 32, 34 and brace members 48,50 are hollow beam structures having a square cross section and made form a non-corrosive yet strong material such as aluminum or any other material known to have such properties. Arch members 36, 38, 40, 42 and overhead beam members 44,46 are secured together with fasteners such as screws or bolts and fastening brackets where necessary. Each of the vertical beam members 36, 38, 40 and 42 of support structure 12 has L-shaped brackets, 54, 56, attached thereto for securing support structure 12 to a concrete floor and thus preventing excessive vibration.

Wash carriage 14 includes a first and second slidable beam member, 60 and 62, respectively, supported by each of the overhead beam members 44 and 46 of support structure 12. Slidable beam members 60 and 62 are spaced apart and each beam orientated transverse to a longitudinal axis defined by overhead beam members 44 and 46. At each end of slidable beam members 60 and 62 there extends a vertical beam member directly adjacent to overhead beam members 44 and 46, these vertical beam members being designated 64, 66, 68 and 70. Each pair of vertical beam members 64, 66, and 68, 70, have longitudinal brace members 76 and 78, respectively 77, attached therebetween. Transverse brace members 77, 79 extend between vertical beam member pairs 64,68 and 68,70, and are attached thereto.

Attached to wash carriage 14 are three elongate, rectangular spray pipe support frames, 80, 82 and 84. Each of these spray pipe support frames include a pair of beams, 86 and 88, 90 and 92, and 94 and 96, respectively, extending the full length of support structure 12 and having end beam members 98 and 100, 102 and 104, and 106 and 108, attached thereto, respectively. Spray pipe support frames 80 and 82 are each attached to vertical beam members 64,66 and 68,70, respectively, of wash carriage 14. Beam pairs 86 and 88 and 92 and 90 of spray pipe support frames 80 and 82, respectively, each are aligned transverse to the vertical beam member pairs 64 and 66 and 68 and 70, and are fastened together by a suitable fastening means such as bolts, 52. Rectangular spray frame 84, having each of elongate beam members 94 and 96 aligned longitudinally, is fixedly attached by fastening means such as bolts 52 to each of transverse brace members 77 and 79 of wash carriage 14.

An air cylinder, 110, including a plunger, 112, and hydraulic control hoses (not shown), is fixedly attached to a brace member, 114. Brace member 114 is attached to overhead beam members 44 and 46 of support structure 12. Plunger 112 is attached to the second slidable beam member 62 of wash carriage 14. Air cylinder 110 is capable of driving plunger 112 from the cylinder, as seen in FIG. 2. As plunger 112 extends and retracts from and to the air cylinder 110, wash carriage 14 moves back and forth on support structure 12. Sensor means, 116 and 117, are capable of detecting the position of wash carriage 14, and may be a microswitch, proximity switch, electric eye or other such sensing device known in the art. The sensor means 116 and 117 signals a control means, such as a programmable controller or microprocessor (not shown), to control the hydraulic solenoid switches (not shown) thereby controlling the direction of plunger 112 within the dual acting air cylinder 110.

The air cylinder 110 may also have some control functions and sensor means 116 and 117 incorporated therein. For this type of ram, the solenoid switches are controlled by the ram thereby automatically changing direction when either fully extended or fully retracted. In addition, a hydraulic ram can be implemented instead of air cylinder 110.

Wash carriage 14 is reciprocated linearly along the longitudinal axis and supported by overhead beam members 44 and 46 of the support structure 12. A bearing means is used to help facilitate movement of wash carriage 14 over support structure 12. The bearing means may include rollers or blocks made out of plastic or ultra-high molecular weight polyethylene (UHMW) or some other such material having similar properties. Blocks, 118, 120, 122 and 124, made of UHMW, are mounted between first and second slidable beam members 60 and 62, respectively, to provide a bearing means so as to reduce friction, wear and noise as wash carriage 14 moves on support structure 12. Roller brackets having rollers attached, 126, 128, 130 (not shown) and 132, (not shown) are attached to the first and the second slidable beam members 60 and 62, respectively, and prevent wash carriage from twisting during the longitudinal excursions back and forth on support structure 12.

Each of lower spray pipe support frames 80 and 82 have lower guide brackets, 138 and 140, 142 (one guide bracket not shown), respectively, to keep wash carriage 14 moving parallel to the longitudinal axis. Lower guide brackets each having a pair of rollers attached thereto 138, 140, 142, (one bracket not shown) are mounted to vertical beam members 36, 38, 40 and 42 of support structure 12. These lower guide brackets tend to support the lower spray pipe support frames 80 and 82. In addition, each guide bracket has two rollers spaced apart to accommodate the respective spray pipe support frame. Because these rollers are mounted on either side of the spray pipe support frame, these rollers tend to prevent the spray pipe support frames from twisting as they reciprocate back and forth with wash carriage 14 on support structure 12.

As seen in FIG. 2, wash carriage 14 reciprocates linearly on support structure 12 between a position, 148, where air cylinder 110 is fully extended and a position, 150, where air cylinder 110 is fully retracted. In one preferred embodiment, the wash carriage 14 is reciprocated on support structure 12 at a rate of eight inches per second. Rates of movement faster than eight inches per second produce more wear and tear on all engagement surfaces and the hydraulic cylinder in addition to producing more noise.

As seen in FIGS. 1 and 3, the equipment on the right side of the longitudinal axis is preferably the mirror image of that on the left; and for that reason just the structure at the right side of the washing apparatus of FIG. 3 will be described in greater detail.

A motor means, 200, is mounted to a motor support structure, 202. The motor support structure 202 includes a pair of square cornered arch members, 204 and 206. Each of the square cornered arch members are attached to each of the spray pipe support frames 80, 82 and 84.

The rotating wash pipes 16, 18 and 20, located on the right side of washing apparatus 10, are mounted to the square cornered arch members 204 and 206 by radial block bearings, 208, 209 and 210, respectively. Each radial block bearing 208, 209, and 210 are preferably formed from a first grooved block member and a second grooved block member that are placed together such that the grooves are arranged coaxially with a spray pipe therebetween. Both the first grooved block member and the second grooved block member are bolted to a mounting member in such a manner that the spray pipe is supported by each of the block members and yet the spray pipe can be easily rotated. The radial block bearings are preferably made from materials such as plastic or UHMW, or any other material known to those skilled in the art to have similar properties.

Rotating wash pipes 16, 18 and 20 are oscillated by a right side oscillating apparatus that includes tie rods 212, 214, 216 and 218, pivot means 220, 222, 224 and 226, and crank 228. Crank 228 is connected to motor means 200 and tie rod 212. Tie rod 212 is connected to one end of pivot 220 with the other end connected to tie rod 214. Tie rod 214 is connected to one end of pivot 222 with the other end connected to tie rod 216. Tie rod 216 is connected to pivot 224 together with tie rod 218.

Tie rod 218 is also connected to pivot 226. Pivot 220 is fixedly attached to rotating wash pipe 20. Similarly, pivot 224 is fixedly attached to rotating wash pipe 18, and pivot 226 is fixedly attached to rotating wash pipe 16. Therefore, rotating wash pipes 16, 18 and 20 rotate or pivot together with pivot 226, 224 and 220, respectively. Crank 228 is attached to the shaft of motor means 200 and therefore rotates with motor shaft 200, thereby converting the rotational motion of the motor shaft to linear motion of the crank. The linear motion of crank 228 is transferred to pivot 20 by tie rod 212. In a similar manner, the linear motion of pivot 220 is transferred to pivot 222, pivot 224 and pivot 226 by tie rods 214, 216 and 218, respectively. The linear motion of either end of the pivot causes each of the pivots to rotate the respective wash pipe attached thereto. In this manner, wash pipes 16, 18 and 20 are rotationally oscillated. In a similar manner, wash pipes 22, 24 and 26 have an oscillating apparatus that is the mirror image of the oscillating apparatus previously described that is used to rotationally oscillate wash pipes 22, 24 and 26.

In one preferred embodiment, motor means 200 is a one horsepower electric gear motor that produces a motor shaft rotation rate of 158 rpm. In one preferred embodiment, the tie rods and pivot means are each made of aluminum bar stock. The tie rods are connected to the pivot means by placing a nylon insert into a bore passing through both the pivot means and the tie rod. A stainless steel pin is then placed through the nylon insert to as to extend on either side of the nylon insert. Lock rings are then placed on either end of the stainless steel pin thereby preventing the stainless steel pin from falling out.

Rotating wash pipes 16, 18, 20, 22, 24 and 26 are all identical high pressure pipes. Wash pipes 29 and 30 are identical to each other, these pipes and are used for applying a foam wax. Wash pipes 28 and 31 are identical to each other and are used for applying a foam pre-soak. Fixed pipes 228, 230, 232 and 234 are mounted to the stationary support structure 12 and therefore neither rotate nor reciprocate. Wash pipes 228 and 232 are used to provide the rocker panel spray. Wash pipes 230 and 234 are used to provide the tire cleaner. Wash pipe 236 is mounted on floor 58 to provide the under body wash. Wash pipe 236 is mounted in a protective channel 238 to prevent the pipe from being damaged by the vehicle.

Lighting means 240, 242, 246, 248, 250, 252, 254 and 256 are mounted to light the way into the wash and provide information as to the progress of the wash. In one preferred embodiment, the lighting means is a 24 v tape light with bulbs mounted on four inch spacings.

Seen in FIGS. 4, 5 and 6 is the rotating wash pipe 16 that is used for providing high pressure fluid streams. The wash pipe 16 is identical to wash pipes 18, 20, 22, 24 and 26 which are also used for high pressure fluid application. Spray pipe 16 is in three separate sections or stages. A first stage 300 is arranged so as to be directed toward the back of the vehicle. A second stage 302 and a third stage 304 that is arranged so as to be directed toward the front or windshield portion of the vehicle to be washed. The ends of wash pipe 16 are threaded to receive threaded plugs 306 and 308 at either end. The ends opposite the threaded plugs 306 and 308 in the first stage 300 and the third stage 304, respectively, are threaded as are both ends of second stage 302. A first pipe coupler 310 securely fastens first stage 300 to the second stage 302 while a second pipe coupler 312 securely fastens second stage 302 to third stage 304. The ends of first stage 300 and second stage 302, held together by coupler 310, have pipe plugs 314 and 316 inserted therein, respectively. Pipe plugs 314 and 316 are each Welded into their respective ends of first stage 300 and second stage 302, respectively. In a similar manner, the ends of second stage 302 and third stage 304, held together by pipe coupler 312, are also plugged and welded.

Fluid is provided to the first stage 300, the second stage 302, and the third stage 304 by feed hoses 318, 320 and 322, respectively. Each of the feed hoses is connected to the respective stage of wash pipe 16 by a three-quarter inch aluminum pipe couple that is welded into a bore thereby forming a T. Fluid exits high pressure water pipe 16 through a series of nozzles distributed along high pressure pipe 16 along a line that is 180° about the circumference of the pipe from the line formed by feed hose connections 318, 320 and 322.

Each stage of high pressure pipe 16 has eight stainless steel nozzles for directing the flow of fluid passing therefrom. Single nozzles 324, 326, 328, 330, 332, 334, 336, 338, 340 and 342 are each screwed into threaded bores on high pressure wash pipe 16. Each of these single nozzles is a straight nozzle and directs fluid in a direction perpendicular to high pressure wash pipe 16. Single nozzle 326 is positioned so that an angle formed between the nozzle and the portion of high pressure wash pipe 16 on the back side of the nozzle is 20°.

Double nozzles 344, 346, 348, 350, 352, 354 and 356 are mounted to high pressure wash pipe 16. In one preferred embodiment as seen in FIG. 7, each double nozzle is formed by threading a brass T 358 into a threaded bore on high pressure wash pipe 16 with an orientation such that the upper portion of the T 358 forms a cylinder that is perpendicular to high pressure wash pipe 16. At each end of the cylinder portion of the T 358, each of a pair of brass 90° elbows, 360 and 362, is threaded therein. Stainless steel nozzles 364 and 366 are threaded into each of the brass elbows. Double nozzles 344 and 346 are arranged with the nozzles parallel to single nozzle 326. Double nozzles 348, 350, 352, 354 and 356 are each arranged to direct a spray in a direction that forms an angle between a line passing through the spray nozzle and an intersecting line that is parallel to high pressure spray pipe 16 that is equal to 20°. In this manner, double nozzles 348, 350, 352, 354 and 356 are each directed generally toward the front of the vehicle to be washed.

High pressure spray pipe 16 is preferably aluminum pipe having one inch inside diameter. Each of the nozzles are preferably made of stainless steel and have spray angles of 0° and 15°. The 0° spray angle nozzles are mounted on the first stage 300 and third stage 304. The 15° spray angle nozzles are mounted on the second stage 302. In one preferred embodiment, both the 0° and 15° spray angle nozzles are manufactured by Spraying Systems, Inc., and are part number Washjet 0002 and 0502, respectively. The high pressure wash pipes are preferably 19 feet long with the first stage 300 being four feet, nine inches in length, the second stage 302 being eleven feet in length and the third stage 304 being three feet, three inches in length. The length of high pressure wash pipe 16 and the nozzle angle arrangement is to accommodate an automobile of 20 feet or less in length and seven feet six inches or less in width. Vehicles longer than 20 feet can also be washed, but will not be cleaned as thoroughly. The nozzle arrangement, nozzle angle and spray pipe length together with the 36 inch linear motion of wash pipe 16 during the reciprocation of wash carriage 14 provide spray coverage for a typical automobile that is 16 feet in length and eight feet wide. The reciprocation of wash carriage 14 together with the oscillation motion of the high pressure pipes 16, 18, 20, 22, 24 and 26 allows spray coverage of the entire vehicle in the time it takes the wash carriage 14 to move the reciprocation length of 36 inches. Therefore, a wash cycle is accomplished in a short amount of time because of the reciprocation rate and the relatively short reciprocation length.

As seen in FIG. 8, wash pipe 230 is a tube having a threaded plug 368 at one end and a brass pipe elbow 372 threaded into the other end. Wash pipe 230, which is used to apply the tire cleaner, is identical to all the other non-high pressure wash pipes, i.e. wash pipes 20, 28, 31, 236, 228, 232, 29 and 234, except for the nozzle arrangement. Therefore, wash pipe 230 will be described in detail. Attached to pipe elbow 370 is a flexible hose suited for conducting fluid to wash pipe 230. The wash pipe 230 is 20 feet long and starting three inches from plug 368 are quarter inch tapped holes, with each hole being twelve inches apart. The quarter inch tapped holes are collinear with each other and are on twelve-inch centers. Twenty-one single nozzles are threaded into the tapped holes with the nozzles directed perpendicular to wash pipe 230. Each nozzle 372, 374, 376, 378, 380, 382, 384, 386, 388, 390, 392, 394, 396, 398, 400, 402, 404, 406, 408, 410, 412, 414, 416, 418 are preferably made of a non-corrosive material such as stainless steel or brass.

In one preferred embodiment, the nozzles are a wide angle nozzle such as those made by Spraying Systems, Inc., part number Fulljet 1/8GG-WM 2.8W.

Wash pipes 228 and 232 that are used for the rocker panel spray are identical to wash pipe 230 except that nozzles having a spray angle of 25° are used instead of full cone nozzles used on pipe 230. In one preferred embodiment, wash pipes 228 and 232 each have 24 nozzles that are each made by Spraying Systems, Inc., part number Fulljet 1/8MEG2502.

Wash pipe 236 that is used for the under body wash is identical to wash pipe 230 except that both nozzles having a spray angle of 110° and 15° are used instead of the full cone nozzles used on wash pipe 230. In one preferred embodiment, the four nozzles at the end of wash pipe 236 that is adjacent to the third stage 304 of high pressure pipe 16, in other words the end of wash pipe 236 that is directed toward the front or windshield portion of the vehicle to be washed, has nozzles having spray angle of 15°. The remaining nozzles on wash pipe 236 each have a spray angle of 110°. In one preferred embodiment, the nozzle having a spray angle of 110° is made by Spraying Systems, Inc., part number Washjet H1/8VV-11004 and the nozzle having a spray angle of 25° also made by Spraying Systems, Inc., part number Sprayjet 1/8MEG2502.

Wash pipes 28 and 31 used for the foam presoak operation and wash pipes 29 and 30 that are used for foam wax are identical to wash pipe 230 except that wash pipes 28 and 31 are one foot shorter than wash pipe 230. There are only 12 nozzles used on each pipe and the nozzles used are different from the full cone nozzles used on wash pipe 230. In one preferred embodiment, the nozzles used for wash pipes 28, 29, 30 and 31 are a Parker Poly-Tite fitting having a quarter inch pipe thread and a three-eighths inch tube size with the screw on cap removed and the tube opening crushed from a circular opening to a flattened oval opening.

Figure 10:
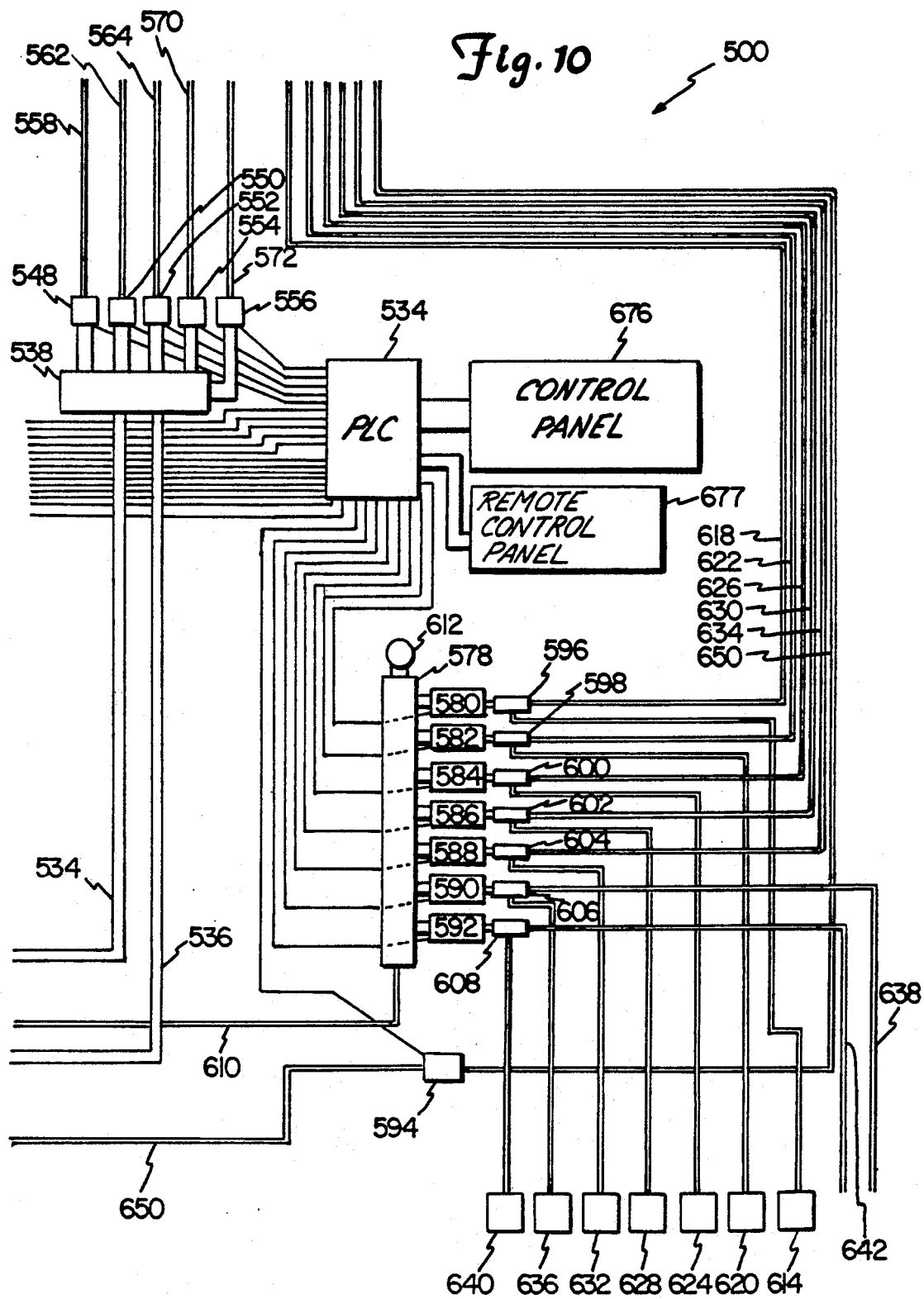

As seen in FIG. 9 and 10, a supply apparatus 500 provides the proper fluids and air to the proper wash pipes at the proper times so that washing apparatus 10 functions properly. A supply of cold water 504 and a supply of hot water 502 are provided to an inlet manifold 506. Water from the cold water supply 504 is conducted along a two-inch pipe and pressurized to 40 pounds per square inch (psi). A solenoid controlled valve 508 is capable of blocking the flow of hot water from the hot water supply 502 to the inlet manifold 506. Similarly, cold water from the cold water supply 504 is provided to inlet manifold 506 at a pressure of 40 psi and with solenoid controlled valve 510 capable of blocking this supply of hot water to inlet manifold 506.

Both the cold water supply 504 and the hot water supply 502 are provided at pressures that are typical of city water supplies. A hot water heater (not shown) is used to heat water supplied by the city water supply. Each of the solenoid controlled valves 508 and 510 are controlled by a programmable logic controller (PLC) as will be discussed later. Both the cold water supply 504 and the hot water supply 502 are each capable of providing water having a flow rate of 40 gallons per minute.

An outlet manifold 512 is connected to inlet manifold 506 by pressure regulators 514, 516, 518 and 520. A pair of conduits 522 and 524 are connected between outlet manifold 512 and a pair of high pressure pumps 526 and 528, respectively. Each of the pressure regulating means 514, 516, 518 and 520 are capable of providing a flow rate of ten gallons per minute at a pressure of 20 psi.

The use of the pressure regulating means in a parallel arrangement between the inlet manifold 506 and the outlet manifold 512, as previously described, effectively reduces the pressure in the outlet manifold 512 without reducing the flow rate. Outlet manifold 512 can then provide water to each of the high pressure pumps 526 and 528 at 20 pounds per square inch at a flow rate of 20 gallons per minute. This pressure regulating scheme does not require large holding tanks that use a gravity feed to supply high pressure pumps with water at a sufficient flow rate and a reduced pressure. These holding tanks consume space and also require heaters to prevent hot water in the tank from cooling when this water sits in the tank for a long period of time before use.

High pressure pumps 526 and 528 are powered by electric motors 530 and 532, respectively. These electric motors 530 and 532 are preferably rated at 10 horsepower and are controlled by the programmable logic controller 534. In one preferred embodiment, high pressure pumps 526 and 528 are rated at 20 gallons per minute at 1,000 psi. Pressurized fluid from high pressure pumps 526 and 528 is conducted by high pressure conduit 534 and 536, respectively, to a high pressure manifold 538. High pressure manifold 538 is preferably made of a non-corrosive material such as brass or stainless steel. In one preferred embodiment, high pressure manifold 538 is made from several brass T fittings. Pressure bypass 540 maybe installed between high pressure pump 526 and high pressure conduit 534 to prevent excessive pressure on elements downstream from high pressure pump 526. Pressure bypass 540 diverts water from conduit 534 and instead routes this water to intake manifold 506. Similarly, pressure regulator 542 may be installed between high pressure pump 528 and high pressure conduit 536 to divert water to intake manifold 506 when the pressure in conduit 536 becomes too great. Pressure gauges 544 and 546 are installed in high pressure conduits 534 and 536, respectively, so that high pressure system elements can be monitored.

High pressure manifold 538 has two input ports connected to high pressure conduits 534 and 536, and five output ports each connected to high pressure solenoids 548, 550, 552, 554 and 556. Each of these high pressure solenoids are controlled by the programmable logic controller. A conduit 558 connects high pressure solenoid 548 to a stage one manifold 560, seen in FIG. 10. Similarly, conduits 562 and 564 connect high pressure solenoids 550 and 552, respectively, to stage two manifold 566 and stage three manifold 568, respectively. Conduit 570 connects high pressure solenoid 554 to each of the rocker panel spray wash pipes 228 and 232. Conduit 572 connects high pressure solenoid 556 to the single under body wash pipe 236.

Various chemicals are added to the fluid flowing in the wash pipes by chemical pumps 574, 576 and low pressure manifold 578 and low pressure solenoids 580, 582, 584, 586, 588, 590, 592, 594 and injectors 596, 598, 600, 602, 604, 606 and 608. Chemical pump 574 provides reverse osmosis water, at low pressure, from a reverse osmosis water supply (not shown) through conduit 610 to low pressure manifold 578. The low pressure solenoids are capable of blocking the flow of fluid from each of the outlets of manifold 578, and each of these solenoids is under control of the programmable logic controller 534. A pressure gauge 612 is used to monitor the fluid pressure in the low pressure manifold 578.

Injector 596 is connected to a pre-soak solution 614 so that as fluid passes through injector 596 the pre-soak solution 614 is mixed therewith by way of a Venturi action. This mixture of pre-soak solution 614 is provided to pre-soak manifold 616 by conduit 618. Similarly, injector 598 mixes a pre-soak foam solution 620 that is carried by conduit 622 to wash pipes 28 and 31. Injector 600 forms a mixture from a soap solution 624 that is carried by conduit 626 to pre-soak manifold 616. Injector 602 forms a mixture with a sealer wax solution 628 that is carried by conduit 630 to pre-soak manifold 616. Injector 604 forms a mixture with a foam wax solution 632 that is carried by conduit 634 to wash pipes 29 and 30. Injector 606 forms a mixture with a tire cleaner solution 636 that is carried by conduit 638 to wash pipes 230 and 235. Injector 608 forms a solution with a rust inhibitor solution 640 that is carried by conduit 642 to wash pipe 236.

In one preferred embodiment, injectors 596 through 608 are adjustable so that the mixture provided by the injector can be changed. Injectors such as these are manufactured by Dema Engineering Co. of St. Louis Mo. under the model number 204B.

Chemical pump 576 is connected to a spot free manifold 644 by conduit 650. Low pressure solenoid 594 is capable of selectively blocking the flow of fluid through conduit 650. The low pressure solenoid 594 is controlled by the programmable logic controller 534.

In one preferred embodiment, the solutions that are used with injectors 596, 598, 600, 602, 604, 606, and 608 are all manufactured by Anderson Chemical Company of Litchfield, Minn. The presoak solution 614 is Anderson part number PAT4812 and is diluted in a range from 64:1 to 128:1, and is applied at a rate of nine gallons per minute. The presoak foam solution 620 is Anderson part number PAT4820 and is diluted 256:1, and is applied at a rate of three gallons per minute in an air lanced mixture. The soap solution 624 is Anderson part number PAT4830 and is diluted in a range from 512:1 to 640:1, and applied at a rate of nine gallons per minute. The sealer wax solution 628 is Anderson part number PAT4850 and is diluted in a range from 600:1 to 750:1, and applied at a rate of nine gallons per minute. The foam wax solution 632 is Anderson part number PAT4840 and is diluted 500:1 and applied at a rate of three gallons per minutes with air lansing. The tire cleaner solution 636 is Anderson part number PAT4800 and is diluted in a range of 5:1 to 15:1, and applied at a rate of 4.2 gallons per minute air lanced. The rust inhibitor solution 640 is Anderson part number PAT4860 and is diluted in a range of one to two ounces per car.

Figure 11:
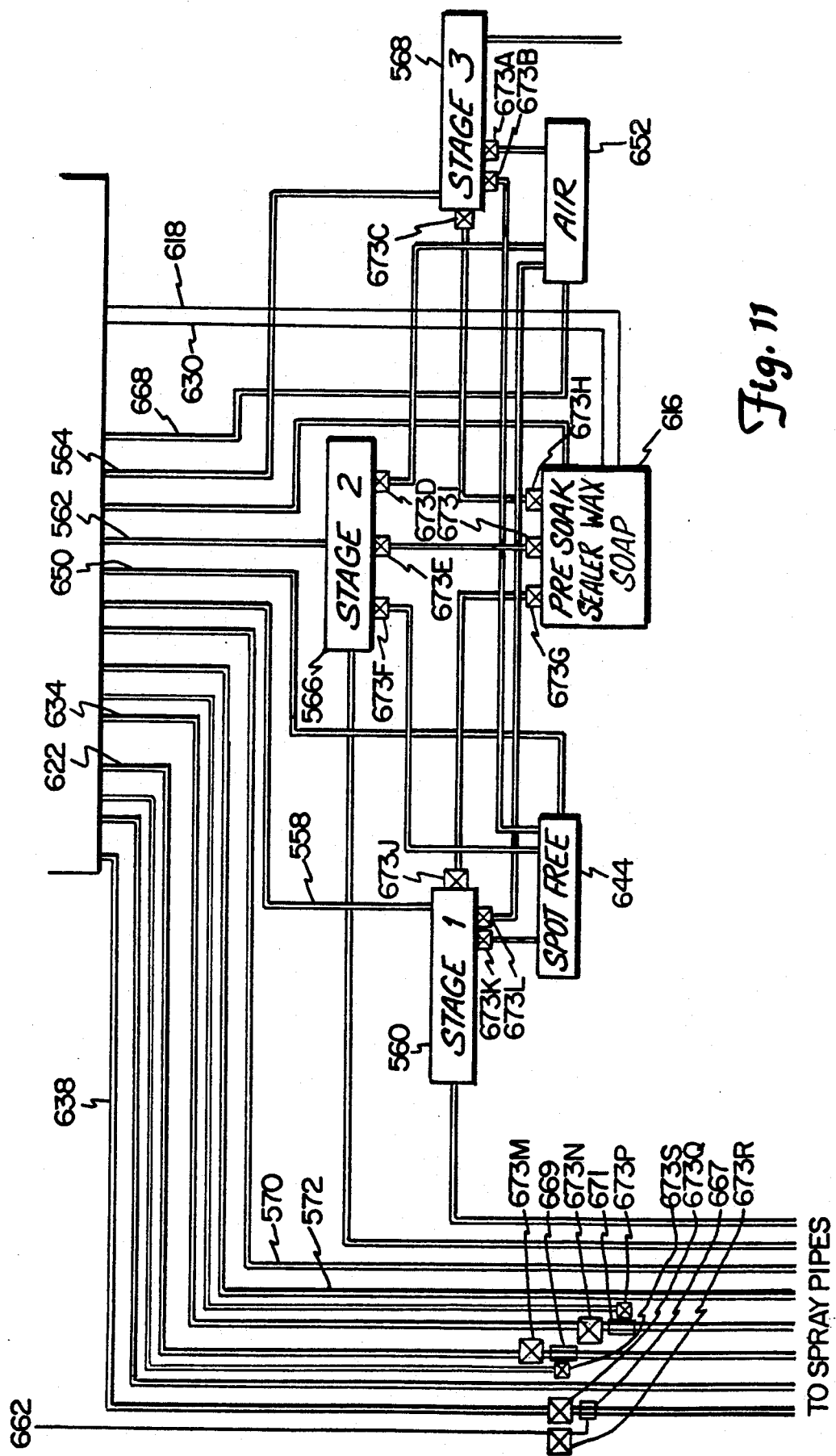
FIG. 11 is a diagrammatic schematic diagram of the fluid mixing operation that is performed by the washing apparatus of the present invention.

As seen in FIG. 11, the use of stage one manifold 560, stage two manifold 566 and stage three manifold 568 allows chemicals from spot free manifold 644 and presoak manifold 616, and air from air manifold 652 to combine in the stage manifolds so that when the stage is pressurized the desired mixture is provided to high pressure pipes 16, 18, 20, 22, 24 and 26. Stage one manifold 560, stage two manifold 566 and stage three manifold 568 each have four inputs and one output, and are preferably manufactured from a non-corrosive material such as stainless steel. In one preferred embodiment each of the manifolds 566, 568, 560, 616 are all made from brass T fittings. The use of staging or pressurizing only sections at a time of high pressure pipe 16 allows smaller high pressure pumps 526 and 528 to be used to achieve the same nozzle pressure as if much larger pumps were used and all three stages of high pressure pipe 16 were pressurized at the same time. Thus, pressurizing high pressure pipe 16 in stages allows either fewer or smaller pumps to be used thereby reducing equipment costs.

An air compressor (not shown) provides air to mix with various solutions for providing a lanced mixture. The air supply is provided to each of four solenoids 654, 656, 658 and 660. Solenoid 660 is capable of blocking the air supply to conduit 662 which is in turn connected to wash pipes 230 and 234. Solenoid 658 is capable of blocking the air supply to conduit 664 which is in turn connected to wash pipes 28 and 31. Solenoid 656 is capable of blocking the air supply to conduit 666 which is in turn connected to wash pipes 29 and 30. Solenoid 654 is capable of blocking the air supply to conduit 668 which is in turn connected to air manifold 652. Each of air solenoids 654, 656, 658 and 660 are controlled by programmable logic controller 534.

Manifolds 667, 669 and 671 are provided so that pressurized air from the air solenoids can be combined with the cleaning solution in the conduit. Check valves 673A, 673B, 673C, 673D, 673E, 673F, 673G, 673H, 673I, 673J, 673K, 673L, 673M, 673N, 673P, 673Q, 673R and 673S, are each capable of allowing air or fluid to flow in only one direction. These check values prevent air or fluid from being forced backward toward the source of air or fluid.

An air supply provided by a compressor (not shown) is connected to an air cylinder solenoid 670. Air cylinder solenoid 670 provides pressurized air for operating air cylinder 110. Air cylinder solenoid 670 is connected to air cylinder 110 by a pair of flexible air conduits. Air cylinder solenoid 670 is connected to programmable logic controller 534. Programmable logic controller 534 activates air cylinder solenoid 670 to extend hydraulic ram 112 by pressurizing air line 672 which in turn causes plunger 112 to extend. As air cylinder 110 extends, wash carriage 14 activates sensor 116 which is connected to programmable logic controller 534 thus initiating air control cylinder 670 to release pressure on flexible air conduit 672 and pressurize flexible air conduit 674 thereby driving plunger 112 into air cylinder 110. As air cylinder 110 retracts, wash carriage 14 activates sensor 117 which is connected to programmable logic controller 534, thus initiating an extension operation. In this manner, the programmable logic controller 534 can either initiate wash carriage reciprocation, stop wash carriage reciprocation or also control the extend of wash carriage reciprocation.

The programmable logic controller 534 receives information from control panel 676 that is located in the pump control room. In addition PLC 534 may also receive information from remote control panel 677 that is located in the wash bay. It is through control panel 676 that the car wash operator can make wash selections and wash cycle adjustments to the washing apparatus 10. The programmable logic controller 534 is programmed to run a series of subprograms or functions such as tire cleaner, pre-soak and pre-soak foam. Each of these functions, when executed by the programmable logic controller, a series of signals are produced by the programmable logic controller to control various solenoids, motors, pumps, etc., such that the washing apparatus 10 performs the function. A complete wash is made up of a series of functions or subprogram 706 rams. In one preferred embodiment, there are eight programmed functions or subprograms. These are: air purge, spot free rinse, high pressure rinse, wax foam, wax, soap, pre-soak foam, and pre-soak. These various functions are combined to form eight different wash cycles, one of which will be discussed in more detail later.

Figure 12:
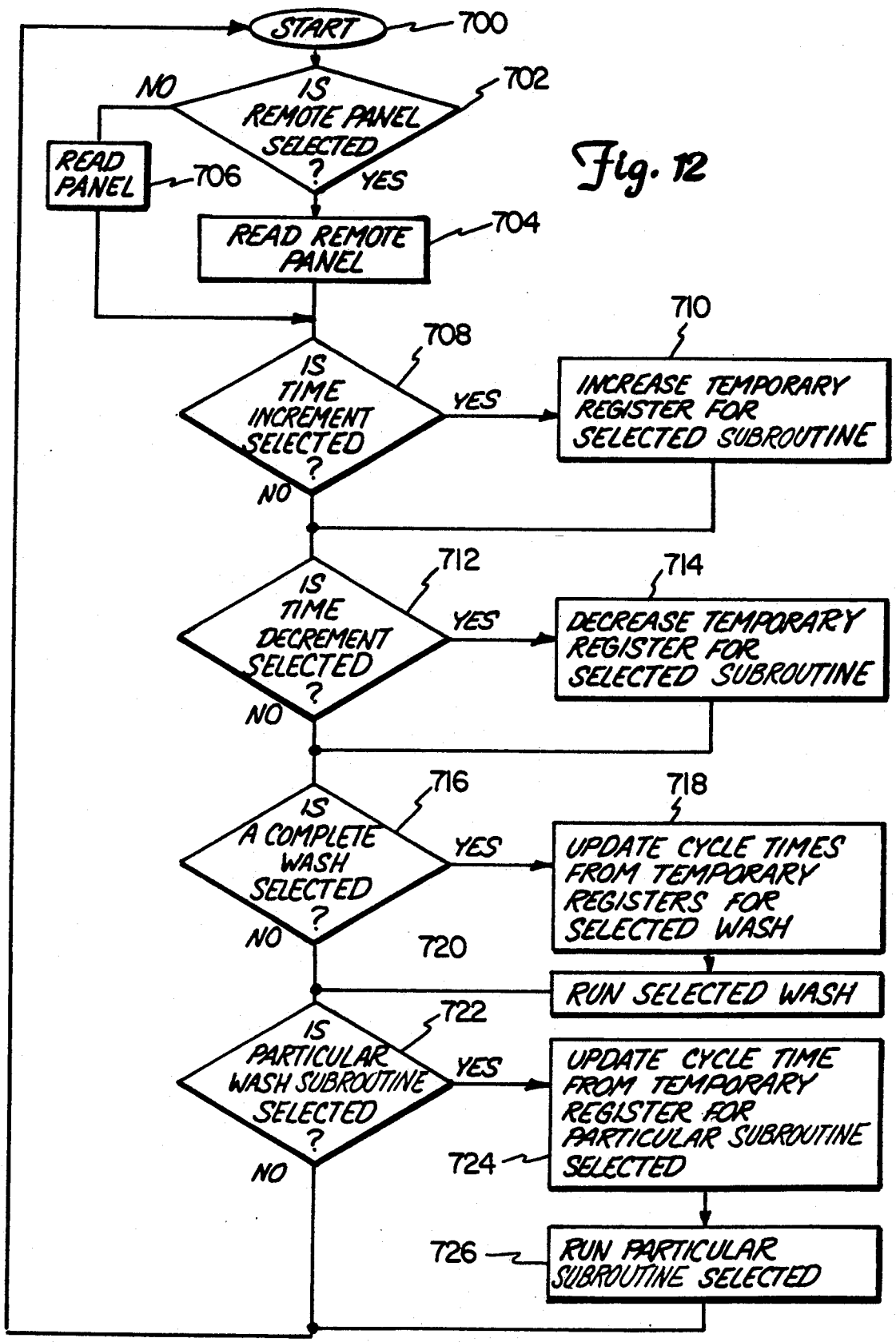
FIG. 12 is a logic flow diagram representing the control panel functions implemented by a controller in the washing apparatus of the present invention.

Seen in FIG. 12 are a series of operations that are representative of how the programmable logic controller 534 is programmed to interface with the control panel 676 and the remote control panel 677. When power is applied to wash apparatus 10, and more particularly to programmable logic controller 534, the controller begins at a start 700. The controller next performs a decision function 702 to determine if the operator has selected a remote panel that may be located in a wash bay or whether the operator intends to control the programmable logic controller from the main control panel which may be in an equipment room. If the remote panel is selected, then a read remote panel function 704 is performed. In performing this function, the PLC may either periodically read the position of the switches at the remote panel, or a changing switch position may send an interrupt signal to the PLC to signal the PLC to read the remote panel. If the remote panel was not selected, the PLC performs a read the main control panel function 706. Reading the main control panel is accomplished in a method similar to reading the remote control panel.

The PLC next determines if the panel read in either function 704 or function 706 indicates that a time increment 708 is selected. If a time increment is selected, a function 710 increases a temporary register for the sub-routine or function selected. The temporary register is increased by a preprogrammed amount each time a time increment is selected. If a time increment is not selected, the PLC performs function 712 which is to check to see if a time decrement function was selected. If a time decrement function was selected, the temporary register representing the sub-routine or function selected is decremented a selected amount of time. In this manner, the operator may increment or decrement the amount of time a particular sub-routine or wash function is run. This may be useful to adjust specific wash cycles to compensate for environmental changes such as increased salt build-up, etc. The sub-routine selected may be accomplished using a rotary switch on the control panels to select from various sub-routines or wash functions. The time increment or decrement select may be accomplished using a two-position momentary switch so that the operator can momentarily select increment or decrement.

The PLC next performs a function 716 that represents a check whether a complete wash was selected at either the control panel or remote control panel. If a complete wash was selected, then the function represented by 718 is performed. Function 718 represents the reading of temporary registers representing changes to cycle times for each of the sub-routines that are part of the wash that is selected. The changes in cycle time for the various sub-routines are those performed in function 710 or function 714. A function represented by 720 is then performed which is to run the complete wash that is selected.

If a complete wash was not selected in 716, or the selected wash was run in 720, then function 722 is performed. Function 722 checks to see if a particular wash sub-routine or function was selected by either the remote panel or the main panel. If a particular wash sub-routine was selected, then the cycle time changes that may have been performed in function 710 or function 714 are read from the temporary register and the particular sub-routine selected is then run represented by function 726.

Functions 716 and 722 allow the operator to either run a complete wash or just a particular sub-routine of that wash. In one preferred embodiment, the control panel has a rotary switch for selecting either a complete wash or a specific sub-routine. A momentary switch is then used to momentarily select either a wash cycle or an individual sub-routine. If either no particular wash function was selected in 722 or after a particular wash sub-routine selected was run in 726, the PLC then goes to the start 700 to begin the cycle over again.

As seen in FIG. 13, a dryer 750 can optionally be attached for blowing water off the vehicle thus preventing water spots. The dryer 750 is mountable to either end of washing apparatus 10 thereby accommodating either a drive-in and back-out operation or drive-through operation. The dryer 750 will be described here as attached to the front of washing apparatus 10 which is used in a drive-in and back-out operation. Dryer 750 is partially supported by square cornered arch 34 on washing apparatus 10. The dryer 750 is also supported by square cornered arch 752 that includes vertical beam members 754 and 756, and horizontal beam member 758. Square cornered arch 752 and square cornered arch 34 are connected by brace members 760 and 762. A dryer support brace 764 is attached between brace members 760 and 762, and is parallel to horizontal beam member 758.

Each of these structural members of dryer 750 are preferably made of a non-corrosive material such as aluminum and fastened together using a convention fastening means such as bolted together or welded together. The vertical beam members 754 and 756 are secured to floor 58 with L-shaped bracket 54 and a conventional fastening means such as bolts.

The dryer 750 further includes air directing structures 766, 768, 770 and 772, and air plowers 774, 776, 778 and 780. Air directing structures 766, 768 and 770 are rectangular box-like structures each having an opening for receiving air and a uniform slot for exiting air. Air directing structure 766 is attached to vertical beam member 756 such that an air escape slot is aligned vertically. Similarly, the air directing structure 768 is mounted to vertical beam member 754 such that an air escape slot 784 is aligned vertically and faces the air escape slot 782 of the air directing structure 766. Air directing structure 770 is mounted to horizontal beam member 758 such that an air escape slot 786 is aligned parallel with horizontal beam member 758 and with the air escape slot 784 facing in a direction downward towards floor 58. The air directing structure 772 extends from transverse brace member 48 out over washing apparatus 10. The air directing structure 772 blows air on the vehicle while it is in position for washing so that drying can begin even before the vehicle is driven past air directing structures 766, 770 and 768. Air directing structure 772 has a flexible portion, such as flexible duct work, that allows structure 772 to move with wash carriage 14. The air directing structure 772 has an inverted V-shaped cross-section and has an air escape slot 786 extending parallel to brace member 760 and faces downward toward floor 58.

Blowers 788, 790, 792 and 794 are provided for forcing air into the air directing structures 766, 768, 770 and 772 so that this air can be directed toward the vehicle thereby blowing water droplets therefrom. Blower 788 is mounted to brace member 762 and is connected by an air conduit 796 to the input port of air directing structure 766. Similarly, blower 790 is mounted to brace member 760 and is connected by an air conduit 798 to the air inlet on air directing structure 768. Blower 792 is mounted to air directing structure 772 and has an air conduit 800 for directing air to the air inlet of air directing structure 770. Blower 794 is mounted to air directing structure 772 and is connected by an air conduit 802 to the air inlet of air directing structure 772.

In one preferred embodiment, blowers 788, 790, 792 and 794 are squirrel cage blowers and are powered by a 10 horsepower electric motor.

In operation, a series of lights flash illuminating square cornered arch 34. An operator selects the desired wash cycle using control panel 676 which in turn causes lights 246, 248, 252 and 254 to flash, thereby illuminating further the wash apparatus 10. As the vehicle is driven through square cornered arch 34, the sensor 116 indicates when the vehicle is in position beneath wash apparatus 10 and a message sign is illuminated indicating to the driver to stop the vehicle. A second sensor 117 indicates if the vehicle is a short vehicle whereupon the back stage 304 of all six high pressure pipes 16, 18, 20, 22, 24 and 26 are disabled to conserve water.

Once the vehicle is in position within wash apparatus 10, the programmable logic controller (PLC) turns on the electric motor thereby causing the wash pipes to rotationally oscillate. The PLC 534 signals the air cylinder solenoid 670 to initiate repetitive cycles of extension and retraction of plunger 112 into air cylinder 110. This operation of air cylinder 110 causes the wash carriage 14 to reciprocate back and forth on support structure 12. The proximity switches 47 and 116 are also enabled to indicate to the PLC when the direction of the wash carriage 14 should be changed. The PLC changes direction of the wash carriage by signaling the air cylinder solenoid 670 based on inputs from sensor 47 and 116.

The PLC then executes the wash cycle selected using control panel 676. In one preferred embodiment, the supreme wash consists of the following sequential operations or sub-routines: low pressure tire cleaner, low pressure pre-soak, low pressure pre-soak foam, low pressure soap, high pressure under body wash, low pressure rust inhibitor, high pressure rocker panel, high pressure stage one hot water, high pressure stage two hot water, high pressure stage three hot water, low pressure foam wax, low pressure sealer wax, high pressure stage one cold water, high pressure stage two cold water, high pressure stage three cold water, and low pressure spot free rinse. By way of example, the operation of the supreme wash will next be described.

The tire cleaner operation is approximately a ten second operation. The operation begins with the programmable logic controller signaling low pressure solenoid 590 to open allowing fluid from manifold 578 to mix in injector 604 with the tire cleaner solution 636 which is then provided to pipes 230 and 234. In addition, chemical pump 574 is turned on to provide low pressure fluid to low pressure manifold 578. After ten seconds, chemical pump 574 is shut off and low pressure solenoid 590 is closed thereby preventing fluid from passing to injector 606.

Next, the pre-soak operation is performed by turning on chemical pump 574, opening low pressure solenoid 580 and opening air solenoid 660. As fluid passes through injector 596, the pre-soak solution 614 is mixed forming a mixture that is provided to pre-soak manifold 616. Pre-soak manifold 616 then allows the mixture to flow to stage one manifold 560, stage manifold 566 and stage manifold 568. Air solenoid 654 provides air to air manifold 652 which in turn provides air to stage one manifold 560, stage two manifold 566 and stage manifold 568. The air lanced mixture in each of the stage manifolds is then provided to the corresponding stage of each of the six high pressure pipes simultaneously. In this manner, the high pressure pipes 16, 18, 20, 22, 24 and 26 are used for low pressure operations. After approximately ten seconds, solenoid 580 is closed along with air solenoid 654 and chemical pump 574 is turned off. The pre-soak foam operation is then performed by opening low pressure solenoid 582, opening air solenoid 656 and turning on chemical pump 574. A mixture of water from chemical pump 574, pre-soak foam solution 620 and air are provided to pipes 28 and 31. After approximately ten seconds, solenoid 582 is closed as is solenoid 656, and chemical pump 574 is shut off.

The soap sequence is then started by opening solenoid 584, opening air solenoid 654 and turning on chemical pump 574. Similar to the pre-soak operation, the soap operation provides air, water and the soap solution 624 to each of the high pressure manifolds, stage one manifold 560, stage manifold 566 and stage three manifold 568. An aerated or lanced soap and water solution is then provided to each of the three stages of the high pressure pipe simultaneously and is forced through the nozzles onto the surface of the vehicle being washed. After approximately ten seconds, solenoid 584 as Well as solenoid 654 are closed and chemical pump 574 is shut down.

The high pressure under body wash is initiated by opening solenoid valve 510 and high pressure solenoid 556 and turning on high pressure pump motors 530 and 532. High pressure hot water is supplied to pipe 236 that is sprayed on the under part of the vehicle. After approximately ten seconds, high pressure pump motors 530 and 532 are shut off and solenoids 510 as well 556 are blocked.

The rust inhibitor operation is initiated by opening solenoid 592 and turning on chemical pump 574. The rust inhibitor solution 646 and water are provided to pipe 236 and are directed toward the under side of the vehicle. After approximately ten seconds, low pressure solenoid 592 is blocked and chemical pump 574 is shut off.

The high pressure rocker panel operation is initiated by turning on high pressure pump motors 530 and 532, and opening cold water solenoid 510 as well as opening high pressure solenoid 554. Cold water at high pressure is provided to pipes 228 and 232 where it is directed by a series of nozzles toward the rocker panels on either side of the vehicle. After approximately ten seconds, solenoid 510 as well as high pressure solenoid 554 are blocked or closed, and high pressure pump motors 530 and 532 are shut off.

The high pressure stage one operation is initiated by turning on high pressure pump motors 530 and 532, opening high pressure solenoid 548 as well as hot water solenoid 508. Hot water under high pressure is provided to stage one manifold 560 which is in turn provided to each of the six first stages of high pressure pipes 16, 18, 20, 22, 24 and 26. After approximately ten seconds, high pressure pumps 530 and 532 are shut off, and hot water solenoid 508 as well as high pressure solenoid 548 are blocked.

A high pressure stage two operation is then initiated similar to the high pressure stage one operation except that high pressure solenoid 550 is opened instead of high pressure solenoid 548. The stage two portion of high pressure pipes 16, 18, 20, 22, 24 and 26 are pressurized for approximately ten seconds. At the end of the high pressure stage two operation, solenoid 550 is closed as well as solenoid 508, and high pressure pump motors 530 and 532 are shut off.

The high pressure stage three operation is performed in a manner similar to both the high pressure stage one operation and the high pressure stage two operation except that high pressure solenoid 552 is opened to provide hot water under pressure to stage three manifold 568. Hot water is conducted to each of the six stage three sections of high pressure pipes 16, 18, 20, 22, 24 and 26 and conducted to high pressure nozzles toward the vehicle to be washed. After approximately ten seconds, high pressure pump motors 530 and 532 are shut down and solenoid 508 as well as solenoid 552 are closed.

The foam wax operation is initiated by opening low pressure solenoid 588 as well as air solenoid 656 and turning on chemical pump 574. The foam wax solution 632 and a water mixture are combined with air forming a foam that is provided to pipes 29 and 30. The foam wax is dispersed through nozzles on pipes 29 and 30 toward the vehicle. After approximately ten seconds, low pressure solenoid 588 and air solenoid 656 are blocked, and chemical pump 574 is shut off.

The sealer wax operation is initiated by opening low pressure solenoid 586 as well as air solenoid 654 and turning on chemical pump 574. The sealer wax solution 628 is provided to pre-soak manifold 616 where it is distributed to all three stages of each of the six high pressure pipes 16, 18, 20, 22, 24 and 26 where it is distributed by the high pressure nozzles over the vehicle. After approximately ten seconds, chemical pump 574 is shut off along with low pressure solenoid 586 as well as air solenoid 654.

The next three operations are the high pressure stage one operation, high pressure stage two operation and high pressure stage three operation. These three operations are identical to the previous high pressure stage one, two and three operations except that the present operations are performed with cold water instead of hot water. Therefore, the only difference in operation is that cold water solenoid 510 is opened and closed instead of hot water solenoid 508 as in the previously described operations.

The spot free rinse operation is initiated by opening low pressure solenoid 594, as well as air solenoid 654 and turning on chemical pump 576. Water is provided from chemical pump 576 to spot free manifold 644 where upon it is distributed to stage one manifold 560, stage two manifold 566 and stage manifold 568. This low pressure water is then provided to all three stages of each of the six high pressure spray pipes 16, 18, 20, 22, 24 and 26 and forced through nozzles toward the Vehicle. After approximately ten seconds, chemical pump 576 is shut off and solenoid 654 as well as solenoid 594 are blocked.

Once the wash cycle is completed, air solenoid 654 is opened to purge system of all chemicals and liquids remaining in the pipes. The purge lasts approximately one minute.

Although the present invention has been described with reference to preferred embodiments, workers skilled in the art will recognize that changes may be made in form and detail without departing from the spirit and scope of the invention.

What is claimed is:

1. A washing apparatus suited for use in washing outside surfaces of vehicles, the apparatus comprising:
    a support means;
    a first conduit means capable of conducting a fluid therealong and elongated along a longitudinal axis for a selected length, said first conduit means being mounted on said support means to permit both selected displacements thereof along said longitudinal axis and selected rotations thereof about said longitudinal axis;
    a plurality of nozzles mounted on said first conduit means such that a fluid conducted through said first conduit means can be conducted through at least one of said nozzles;
    a first drive means capable of selectively reciprocating said first conduit means along said longitudinal axis between selected positions separated by a length less than said first conduit means length; and
    a second drive means capable of selectively causing said first conduit means to undergo selected reciprocal angular displacements about said longitudinal axis whereby said first conduit means can be displaced both about and along said longitudinal axis such that a said fluid forced through said nozzle will be directed through a selected portion of a selected plane through which such a fluid passes.

2. The washing apparatus of claim 1 wherein said first conduit means having a tubular shape and being supported by each of a pair of radial bearings.

3. The washing apparatus of claim 2 wherein said support means includes a cylindrical member having each of a pair of linear block bearings which travel thereon, said block bearings being attached to said first conduit means thereby allowing said first conduit means to move along said longitudinal axis.

4. The washing apparatus of claim 1 further comprising a plurality of said first conduit means, each of said plurality being mounted on said support means.

5. The washing apparatus of claim 4 wherein said longitudinal axis of each of said plurality of first conduit means being substantially parallel with said nozzles being mounted closer together on said first conduit means towards either end than towards the middle of said first conduit means.

6. The washing apparatus of claim 1 wherein said first drive means is an air cylinder.

7. The washing apparatus of claim 1 wherein said support means includes:
   a first support means which is stationary; and
   a second support means being movably mounted on said first support means and capable of selected displacements thereof along said longitudinal axis, said first conduit means being movably mounted on said second support means and capable of selected rotations thereof about said longitudinal axis.

8. The washing apparatus of claim 7 further comprising a plurality of said first conduit means, each of said plurality of first conduit means being mounted on said second support means.

9. The washing apparatus of claim 1 wherein said second drive means is an electric motor.

10. The washing apparatus of claim 1 further including:
    a sensor means capable of producing a signal;
    a valve means for selectively blocking said fluid from selected portions of said first conduit means; and
    a control means connected to said sensor means as well as said valve means, said control means capable of selectively controlling said valve means based on said signal change from said sensor means.

11. The washing apparatus of claim 10 wherein said valve means is a solenoid controlled valve.

12. The washing apparatus of claim 10 wherein said sensor means includes:
    a source means for emitting light;
    a receiver means capable of receiving light from said source means, said receiver means producing an output signal based on light received from said source means.

13. The washing apparatus of claim 1 further including a drying means mounted on said support means.

14. The washing apparatus of claim 1 further including:
    a plurality of valve means suited for connection to each of a plurality of fluid sources as well as said first conduit means for selectively blocking fluid flow to said first conduit means; and
    a control means connected to each of said plurality of valve means for selectively controlling fluid flow to said first conduit means whereby fluid flow from each of said plurality of fluid sources to said conduit means is capable of being blocked for selected time intervals in selected sequences.

15. The washing apparatus of claim 14 wherein said control means is capable of selectively blocking fluid flow to said first conduit means from each of said plurality of fluid sources in a first preselected sequence and with said control means selectively controlling air flow to said first conduit means from a source of pressurized air in a second preselected sequence.

16. The washing apparatus of claim 14 wherein said control means further includes an input means for selecting one of a plurality of selected sequences.

17. The washing apparatus of claim 14 wherein said control means further includes an input means for incrementing as well as decrementing selected time intervals of selected sequences.

18. The washing apparatus of claim 14 wherein said control means further includes an input means for selecting a selected portion of selected sequences.

19. The washing apparatus of claim 14 further including:
    a first manifold suited for connection to a fluid source;
    a second manifold;
    a plurality of pressure regulation means each of said plurality connected between said first manifold and said second manifold; and
    a pumping means connected to said second manifold and said first conduit means for forcing fluid from said fluid source through at least one of said nozzles.

20. The washing apparatus of claim 1 further including:
    a pump means suited for connection to a first fluid source for providing pressurized fluid; and
    a venturi means connected to said pump means for receiving pressurized fluid, said venturi means suited for connection to a second fluid source wherein pressurized fluid from said first fluid source passing through said venturi means is capable of drawing fluid from said second fluid source to combine therewith, a mixture of fluids from said first fluid source and said second fluid source are provided to said first conduit means to be conducted through at least one of said nozzles.

21. A method suited for washing outside surfaces of vehicles, the method comprising the steps of:
    providing a support means;
    providing a first conduit means elongated along a longitudinal axis for a selected length, said first conduit means being mounted on said support means;
    providing a plurality of nozzles mounted on said first conduit means;
    moving selectively said first conduit means in a reciprocating manner along said longitudinal axis between selected positions separated by a length less than said first conduit means length;
    moving selectively said first conduit means through an angular displacement about said longitudinal axis; and
    conducting selectively a fluid through said first conduit means through at least one of said nozzles whereby said fluid forced through said nozzle will be directed through a selected portion of a selected plane.

* * * * *

UNITED STATES PATENT AND TRADEMARK OFFICE
CERTIFICATE OF CORRECTION

PATENT NO. : 5,266,123

DATED : November 30, 1993

INVENTOR(S) : SHADLEY F. BRAND

It is certified that error appears in the above-identified patent and that said Letters Patent is hereby corrected as shown below:

Col. 3, line 8, after "respectively", delete "77"

Col. 6, line 4, delete "Welded", insert --welded--

Col. 7, line 50, after "having", insert --a--

Col. 14, line 64, delete "Well", insert --well--

Col. 16, line 25, delete "Vehicle.", insert --vehicle.--

Signed and Sealed this

Thirty-first Day of May, 1994

Attest:

BRUCE LEHMAN

Attesting Officer    Commissioner of Patents and Trademarks